3,756,976
PRODUCTION OF ODOR-FREE POLYMER LATEX

Carl A. Uraneck and John E. Burleigh, Bartlesville, Okla., assignors to Phillips Petroleum Company
No Drawing. Filed Apr. 28, 1971, Ser. No. 138,247
Int. Cl. C08f 45/24
U.S. Cl. 260—29.7 PT                    10 Claims

ABSTRACT OF THE DISCLOSURE

Objectional thiol odor is removed from a polymer latex by treating a thiol-containing polymer latex with an agent which converts the thiol to a compound which is not characterized by an objectionable odor.

---

This invention is related to the production of polymers. In a further aspect, this invention is related to the removal of residual thiol remaining in a polymer latex after the polymerization step in the production of polymers by emulsion polymerization.

In the production of polymers by emulsion polymerization, it is well known by those skilled in the art to use thiols and/or thiol precursors in the polymerization step as effective molecular weight modifiers. A disadvantage, however, in this polymerization procedure is that the polymer latex, subsequent to the polymerization step, contains residual thiol which imparts to the latex and to the polymer recovered therefrom a characteristic thiol or mercaptan odor. This odor renders the latex and polymer objectionable for certain uses.

Thus, it is highly desirable to produce a thiol-free, i.e., a "low-odor," latex product which is especially useful in paint, floor polish, adhesive formulations and the like. The polymers recovered from the "low-odor" latex are also especially suited to the preparation of sponge rubber, paper coating, textiles, rug backing, containers and certain processing machinery.

In addition, such thiol-free or essentially thiol-free latexes or polymers have a reduced tendency to tarnish or corrode certain metals which they may contact. This advantage produces the possibility of applications which were not heretofore feasible due to the tarnishing nature of the thiol-containing latexes and polymers recovered therefrom.

It is thus the object of this invention to provide a process for the removal of thiol from polymer latex.

Other objects, aspects, and the many advantages of the invention will be apparent to one skilled in the art from a study of the following specification, examples, and appended claims.

We have now discovered that the residual thiol content, and thus the objectionable thiol odor, can be substantially reduced if not eliminated from polymer latex by treating a thiol-containing polymer latex with an agent which converts the residual thiol in the latex to a compound which is not characterized by an objectionable odor. In addition, the treatment of the latex according to this invention has the further advantage that there is essentially no effect on the properties of the polymer. The thiol-free polymer thus produced accordingly retains the uses of the untreated, i.e., the thiol-containing, polymer as well as the uses, above discussed, of the "low-odor" polymer and latex.

The treating agent of this invention is a compound selected from the group consisting of sulfoxides, esters of nitrous acid, alkali metal salts of nitrous acid, esters of hypohalous acids, alkali metal salts of hypohalous acids, albaline earth metal salts of hypohalous acids, alkali metal salts of halous acids, alkaline earth metal salts of halous acids, N-halogenated arylsulfonamides, alkali metal salts of N-halogenated arylsulfonamides, iodoso-substituted aromatic compounds, nitro group-containing aromatic disulfides, and nitrogen oxides.

The sulfoxides which are useful as treating agents in this invention are preferably those represented by the general formula

wherein R is selected from aliphatic and cycloaliphatic radicals having 1 to 20 carbon atoms. Examples of sulfoxides within the scope of the above formula include dimethyl sulfoxide, dicyclohexyl sulfoxide, di-n-butyl sulfoxide, and dieicosyl sulfoxide.

The esters of nitrous acid useful as the treating agent in this invention are preferably those represented by the formula R—ONO wherein R is selected from aliphatic and cycloaliphatic radicals having 1 to 20 carbon atoms. Examples of esters of nitrous acids within the scope of the above formula include ethyl nitrite, n-pentyl nitrite, n-decyl nitrite, cyclododecyl nitrite, and cyclohexyl nitrite.

The alkali metal salts of nitrous acid useful as the treating agent in this invention are preferably those represented by the formula $MNO_2$ wherein M is a metal of Group Ia of the Periodic Table. Examples of alkali metal salts of nitrous acid within the scope of the above formula include sodium nitrite, potassium nitrite, and lithium nitrite.

The esters of hypohalous acids useful as treating agents in this invention are preferably those represented by the general formula R—OX wherein X is a halogen selected from chlorine, bromine and iodine, and R is selected from aliphatic and cycloaliphatic radicals having 1 to 20 carbon atoms. Examples of esters of hypohalous acids within the scope of the above formula include tert-butyl hypochlorite, 1-ethylcyclooctyl hypochlorite, 3-methyl-3-hexyl hypochlorite, 4-eicosyl hypochlorite, tert-butyl hypobromite, 3-ethyl-3-octyl hypobromite, and 1-methyl-cyclohexyl hypoiodite. It is noted that in the esters of hypohalous acid it is preferred that the R group in the general formula be a tertiary aliphatic radical.

The alkali metal salts of hypohalous acids useful as the treating agent in this invention are preferably those represented by the general formula MOX wherein M is a metal of Group Ia of the Periodic Table and X is a halogen selected from chlorine, bromine and iodine. Examples of alkali metal salts of hypohalous acids within the scope of the above formula include sodium hypochlorite and lithium hypobromite.

The alkaline earth metal salts of hypohalous acids useful as treating agents in this invention are preferably those represented by the general formula $M'(OX)_n$ wherein M' is a metal of Group IIa of the Periodic Table, X is a halogen selected from chlorine, bromine and iodine, and $n$ is the valence of M'. Examples of alkaline earth metal salts of hypohalous acids within the scope of the above formula include calcium hypochlorite, barium hypoiodite, and beryllium hypobromite.

The alkali metal salts of halous acids useful as the treating agent in this invention are preferably those represented by the general formula MOXO wherein M and X have the same meaning as described above for the alkali metal salts of hypohalous acids. Examples of alkali metal salts of halous acids within the scope of the above formula include sodium chlorite, potassium chlorite, lithium bromite, and rubidium iodite.

The alkaline earth metal salts of halous acids useful as treating agents in this invention are preferably those represented by the general formula $M'(OXO)_n$ wherein M', X and $n$ have the same meaning as described above for the alkaline earth metal salts of hypohalous acids. Examples of alkaline earth metal salts of halous acids within the scope of the above formula include calcium chlorite, beryllium bromite, barium iodite, and magnesium chlorite.

The N-halogenated arylsulfonamides useful as treating agents in this invention are preferably those represented by the general formula R'—SO$_2$NX$_2$ wherein R' is an aromatic radical having 6 to 20 carbon atoms and X is a halogen selected from chlorine, bromine and iodine. Examples of N-halogenated arylsulfonamides within the scope of the above formula include N,N-dichlorobenzenesulfonamide, N,N-dichloroparatoluenesulfonamide, N,N-diiodo-4-ethoxybenzenesulfonamide, and N,N-dibromo-3,5-dicarboxymethylbenzenesulfonamide.

The alkali metal salts of N-halogenated arylsulfonamides useful as treating agents in this invention are preferably those represented by the formula R'—SO$_2$NXM wherein R' is an aromatic radical having 6 to 20 carbon atoms, X is a halogen selected from chlorine, bromine and iodine, and M is a metal of Group Ia of the Periodic Table. Examples of alkali metal salts of N-halogenated arylsulfonamides within the scope of the above formula include Chloramine T, which is the sodium salt of N-chloro-p-toluenesulfonamide, and Chloramine B, which is the sodium salt of N-chlorobenzenesulfonamide.

The iodoso-substituted aromatic compounds useful as treating agents in this invention are preferably those represented by the general formula R'—I—O wherein R' is an aromatic rarical having 6 to 20 carbon atoms. Examples of iodoso-substituted aromatic compounds within the scope of the above formula include iodosobenzene, o-iodosobenzoic acid, p-iodosobenzoic acid, and 1-iodoso-4,5-di(1-pentyl)-naphthalene.

The nitro group -containing aromatic disulfides useful as the treating agent in this invention are preferably those represented by the formula

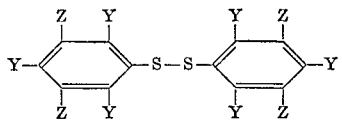

wherein Y is selected from the group consisting of H, NO$_2$, SO$_3$H, and CO$_2$H with at least one Y on each ring being a NO$_2$ group; Z is selected from the group consisting of H, SO$_3$H, and CO$_2$H; and further wherein on each ring there is at least one of a SO$_3$H and a CO$_2$H group. Examples of nitro group-containing aromatic disulfides within the scope of the above formula include bis(2-nitro-4-carboxyphenyl)disulfide,
bis(2-nitro-4-sulfophenyl)disulfide,
bis(2-carboxy-4-nitrophenyl)disulfide, and
bis(3-sulfo-4-nitrophenyl)disulfide.

The nitrogen oxides useful as treating agents in this invention are preferably those represented by the formulas N$_2$O$_4$, N$_2$ and NO, which are known to be dinitrogen tetroxide, nitrogen dioxide and nitric oxide, respectively.

In addition, mixtures of the above treating agents can also be employed in this invention.

The quantity of treating agent utilized in this invention is at least 0.25 mole of agent per mole of residual thiol in the thiol-containing latex to be treated. However, the quantity of agent utilized can be an amount, on a molar basis, which is equal to the amount of thiol or thiol precursor employed as a polymer molecule weight modifier or of regulator in the polymerization. The preferred amount of treating agent is in the range of 0.5 to 5 moles treating agent per mole of residual thiol in the thiol-containing latex to be treated.

In some instances, certain polymer latexes may contain materials other than thiols which also react with the treating agents used in this invention. In these instances, it may be necessary to add sufficient additional treating agent to consume these materials before or during the consumption of residual thiol by the treating agents of the invention.

The quantity of residual thiol and, from this, the quantity of treating agent can be determined quantitatively by the measurement of thiol concentration in the latex according to methods which are well known in the art, such as the amperometric titration of thiol with silver ion as the titrant.

In the treating process itself, the thiol-containing latex can be contacted with the treating agent of this invention immediately subsequent to the polymerization step. However, it is preferred that any unreacted monomer remaining in the latex be removed prior to the treatment. The removal of unreacted monomer is conducted by any process known in the art, such as by fractionation or steam stripping. It is noted that the monomer removal, such as by either fractionation or steam stripping, does not remove the thiol contaminant in that the monomers are ordinarily much lower boiling; thus the thiols are not removed. Subsequent to the monomer removal, the thiol-containing polymer latex is treated with the treating agent of this invention. The temperature employed in the treatment can be in the range from —10° to 100° C., preferably in the range from 5° to 50° C. The time required for the conversion of the thiol to the non-odoriferous compound is in the range from 0.02 to 148 hours, preferably in the range from .25 to 12 hours.

In addition, the treating agent can be added in increments throughout the treating time or the entire quantity of agent required can be added in one batch.

Following the treatment of the polymer latex, the latex can be processed by conventional procedures. For example, the latex can be coagulated with a salt and acid and the polymer separated and dried. Or, the treated latex may be vented or purged with an inert gas to remove any residual volatile treating agent prior to incorporation of the latex into a formulation for a paint, floor polish, and the like. Generally, conventional processing of the treated latex, e.g. coagulation, will destroy any residual latex treating agent employed according to this invention.

The latex treatment of this invention can be applied to any polymer latex which has been prepared with the use of a thiol or a thiol precursor as a molecular weight modifier in the polymerization step of an emulsion polymerization process wherein the polymer latex contains residual thiol in the polymer latex at the conclusion of the polymerization step. Examples of typical thiols used for modification of emulsion polymerizations include the following: n-octylthiol, n-decylthiol, n-dodecylthiol, n-tridecylthiol, n-tetradecylthiol, tert-nonylthiol, tert-decylthiol, tert-dodecylthiol, tert-hexadecylthiol, sec-decylthiol, sec-dodecylthiol, thiophenol, 1-naphthylthiol, and the like. Commercially available thiol modifiers are often mixtures of thiols, e.g. a mixture of tert-C$_{12}$, tert-C$_{14}$ and tert-C$_{16}$ thiols. The treating agents of this invention are, of course, effective against the above-named thiols as well as against those not named, as the list is merely illustrative and not limitative of the scope of the invention.

Generally, the term "polymer latexes" as used herein refers to latexes of polymers of conjugated dienes, or vinyl aromatic compounds, or acrylate compounds (including substituted acrylates and the acids as well as the esters thereof). Copolymers of one or more of the above with each other or with other polymerizable comonomers are also included in this class of polymers. Some typical examples include latexes of polystyrene, polymethylmethacrylate, resinous butadiene/styrene copolymers, styrene/acrylonitrile copolymers, polychloroprene (neoprene), SBR polymers, and butadiene/vinylpyridine copolymers. Also included are latexes of graft polymers such as the ABS resins and impact-resistant polystyrene.

The following examples are provided to further illustrate the invention but are not intended to limit the scope thereof.

In each of the following examples, a thiol-containing polymer latex was prepared as follows and was treated according to the process of this invention. In each example, 100 grams of a butadiene/styrene copolymer latex having 21.2 percent by weight solids content (SBR 1500) and from which residual monomers had been removed was mixed with a quantity of tert-dodecylthiol to form a mixture. The mixture was agitated for 16 hours at 5° C. prior to treatment with the agent of this invention. In Examples 1, 2 and 3, 0.29 gram (1.4 mmoles) of the thiol were mixed with the latex. In Examples 4 and 5, 0.5 mmole of the thiol were utilized, and in Examples 6, 7 and 8, 1.44 mmoles of the thiol were mixed with the latex as above described.

The thiol-containing polymer latexes were then treated with various treating agents of this invention to remove the thiol. The thiol-latex-agent mixture was then agitated at 25° C. and analyzed by amperometric titration with $AgNO_3$ at various time intervals.

EXAMPLE 1

A total of 0.38 gram (3.5 mmoles) of tert-butyl hypochlorite (t-BuOCl) was added to the thiol-containing polymer latex to which had been added 0.2 gram of $Na_3PO_4$ to buffer the system to prevent coagulation. The t-BuOCl was added in 0.7 mmole increments. Table 1, below, indicates the decreasing quantity of residual thol in the polymer latex (as percent of initial thiol) with increasing time. Table 1 also shows the times when the incremental quantities of t-BuOCl were added.

TABLE 1

| Hours | Residual SH, percent | t-BuOCl (mmole) |
|---|---|---|
| 0.0 | 100 | 0.7 |
| 0.5 | 74.2 |  |
| 1.0 | 73.8 |  |
| 1.2 |  | 0.7 |
| 1.7 | 53.9 |  |
| 2.2 | 53.5 |  |
| 3.8 |  | 0.7 |
| 4.3 | 30.4 |  |
| 4.8 | 31.0 |  |
| 5.0 |  | 0.7 |
| 5.6 | 10.5 |  |
| 6.0 | 10.4 |  |
| 6.2 |  | 0.7 |
| 6.8 | 0.8 |  |

At the end of the time period, no thiol odor was detected.

EXAMPLE 2

A total of 0.46 gram (4.2 mmoles) of tBuOCl was added to the thiol-containing latex to which was also added 0.4 gram (0.2 gram at time 0 and 0.2 gram at time 0.75 hour) of $Na_3PO_4$. The t-BuOCl was added in 0.7-mmole increments. Table 2, below, indicates the decreasing quantity of resdiual thiol in the polymer latex (as percent of initial thiol) with increasing time. Table 2 also shows the times when the incremental quantities of t-BuOCl were added.

TABLE 2

| Hours | Unreacted SH, percent | t-BuOCl (mmole) |
|---|---|---|
| 0.0 | 102 | 0.7 |
| 0.25 |  | 0.7 |
| 0.50 |  | 0.7 |
| 0.75 | 27.4 | 0.7 |
| 1.00 |  | 0.7 |
| 1.25 | 4.8 | 0.7 |
| 1.5 | 0.45 |  |
| 3.0 | 0.98 |  |

At the end of the time period, no thiol odor was detected. Note at hour 0 there was 102% unreacted thiol. This, of course, means that something in addtion to the added thiol also reacted with the titrant.

EXAMPLE 3

A total of 0.38 gram (3.5 mmoles) of t-BuOCl was added to the thiol-containing polymer latex to which was also added 0.4 gram of $Na_3PO_4$. The t-BuOCl was added in a single batch. Table 3, below, indicates the decreasing quantity of residual thiol in the polymer latex with increasing time.

TABLE 3

| Hour | Unreacted SH, percent | t-BuOCl (mmole) |
|---|---|---|
| 0.0 | 101 | 3.5 |
| 0.5 | 0.63 |  |
| 1.0 | 1.2 |  |

At the end of the time period, no thiol odor was detected. Note at time 0 there was 101% unreacted thiol. This, of course, means that something in addition to the added thiol also reacted with the titrant.

EXAMPLE 4

A total of 1.0 mmole of sodium nitrite ($NaNO_2$) was added to the thiol-containing polymer latex. The sodium nitrite was added in a single batch.

The mixture was sampled at time 0.5 hour and at time 18 hours for thiol content. The analysis results showed that the thiol content at 18 hours was 12 percent less than the thiol content found at 0.5 hour. This demonstrates that sodium nitrite consumes thiol in the presence of a polymer latex.

EXAMPLE 5

An alkaline solution of o-iodosobenzoic acid (0.68 gram of o-iodosobenzoic acid in 20 ml. of 0.132 N KOH) was added to the thiol-containing polymer latex. The amount of alkaline solution was sufficient to provide 2 mmoles of the iododsobenzoic compound to the reaction mixture. Table 4, below, indicates the decreasing quantity of residual thiol in the polymer latex (as percent of initial thiol) with increasing time.

TABLE 4

| Reaction time, hours: | Percent of original [a] thiol remaining |
|---|---|
| 0.5 | 33 |
| 2.2 | 19 |
| 74.7 | 6 |

[a] Based on the 0.5 mmole of thiol added to the latex.

From Table 4, the ability of the iodosobenzoic compound to consume thiol in the presence of a polymer latex is clearly demonstrated.

EXAMPLE 6

A total of 5.04 mmoles of Chloramine T, the sodium salt of N-chloro-p-toluenesulfonamide, was added to the thiol-containing polymer latex. The Chloramine T was added in a single 2.88 mmole batch followed by 0.72-mmole increments at various time intervals. Table 5, below, indicates the decreasing quantity of residual thiol in the polymer latex with increasing time.

EXAMPLE 7

A total of 5.12 mmoles of Chloramine B, the solution salt of N-chlorobenzenesulfonamide, was added to the thiol-containing polymer latex. The Chloramine B was added in increments, the initial increment being 2.96 mmoles with 0.72-mmole increments being added periodically. Table 5, below, indicates the decreasing quantity of residual thiol in the polymer latex with increasing time.

TABLE 5

| Example | 6 | 7 |
| --- | --- | --- |
| Chloramine T, mmole | 2.88 | |
| Chloramine B, mmole | | 2.96 |
| Percent thiol remaining at— | | |
| 0.5 hour | 14 | 22 |
| 1.5 hour | 14 | 23 |
| Chloramine T, mmole | 0.72 | |
| Chloramine B, mmole | | 0.72 |
| Percent thiol remaining at— | | |
| 0.5 hour ª | 6 | 17 |
| 64.0 hour | 6 | 16 |
| Chloramine T, mmole | 0.72 | |
| Chloramine B, mmole | | 0.72 |
| Percent thiol remaining at 0.5 hour ª | 4 | 6 |
| Chloramine T, mmole | 0.72 | |
| Chloramine B, mmole | | 0.72 |
| Percent thiol remaining at 0.5 hour ª | 0.6 | 1.3 |

ª These times refer to the time elapsed after the latest addition of the treating agent.

The results of Table 5 demonstrate the ability of Chloramine T and Chloramine B to consume thiol in the presence of a polymer latex.

EXAMPLE 8

As in previous Examples 6 and 7, the latex sample to be treated contained 1.44 mmole of tert-dodecylthiol while the treating agent in this run was a solution of sodium chlorite ($NaClO_2$) in water (1.44 mmole/ml.). The results in this run are shown below in Table 6.

TABLE 6

| Percent thiol remaining at (hours): | $NaClO_2$, mmoles |
| --- | --- |
| — (0.0) | 2.88 |
| 8.3 (0.5) | — |
| 8.2 (1.5) | — |
| 1.5 (0.5)ª | 0.72 |
| 0.58 (64.0) | — |

ª These times refer to the time elapsed after the latest addition of the treating agent.

The results of Table 6 demonstrate the ability of sodium chlorite to consume thiol in the presence of a polymer latex.

EXAMPLE 9

Another run was carried out in which 0.7 mmole of tert-octylthiol was placed in a 100 g. sample of the previously employed latex. To this mixture was added a solution of 1.4 mmole of bis(2-nitro-4-carboxyphenyl) disulfide in 10.6 ml. of 1.132 N KOH. After the mixture was agitated for 0.5 hour at room temperature, the reactor was opened and no odor of the tert-octylthiol could be detected. This result indicates the above reagent to be effective in consuming the lower molecular weight $C_8$-thiol in the presence of a polymer latex.

EXAMPLE 10

The same reagent used in Example 9 was employed to treat a 100 g. sample of polymer latex containing 0.5 mmole of tert-dodecylthiol. The amount of reagent used was 1.05 mmoles in 7.7 ml. of the 0.132 N KOH solution. Samples of the reaction mixture were withdrawn and analyzed for thiol content. At 0.5 hour, 91.1 percent of the original thiol content remained, while at 2.25 hours, the remaining thiol was 58.4 percent of the original thiol content. These results demonstrate that the nitro-substituted aromatic disulfide employed consumed the thiol in the presence of a polymer latex.

EXAMPLE 11

A 100 g. sample of polymer latex of the same type as that employed in the previous examples and which contained 1.44 mmoles tert-dodecylthiol was treated with an aqueous solution of diethyl sulfoxide (0.2 M). The amount of solution employed was sufficient to provide 2.88 mmoles of the diethyl sulfoxide. After allowing the mixture to react for 3 hours at room temperature, a sample of the reaction mixture was withdrawn and analyzed. The analysis showed that a significant amount of the tert-dodecylthiol originally present was consumed by the reaction with the diethyl sulfoxide in the presence of a polymer latex.

Reasonable variations and modification are possible within the scope of the foregoing disclosure without departing from the spirit and scope thereof.

Having described our invention, that which is claimed is:

1. A process for the production of an essentially thiol-free polymer latex from a thiol-containing polymer latex system having residual amounts of a thiol compound therein which comprises treating said residual thiol-containing polymer latex with at least 0.25 mole per mole of residual thiol in said thiol-containing latex of an agent selected from the group consisting of alkali metal salts of nitrous acid, esters of hypohalous acids, alkali metal salts of halous acids, N-halogenated arylsulfonamides, alkali metal salts of N-halogenated arylsulfonamides, iodoso-substituted aromatic compounds, and nitro group-containing aromatic disulfides, and wherein said alkali metal salts of nitrous acid are represented by the formula $MNO_2$; said esters of hypohalous acids are represented by the formula R—OX; said alkali metal salts of halous acids are represented by the formula MOXO; said N-halogenated arylsulfonamides are represented by the formula $R'—SO_2NX_2$; said alkali metal salts of N-halogenated arylsulfonamides are represented by the formula $R'—SO_2NXM$; 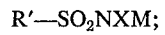

said iodoso-substituted aromatic compounds are represented by the formula R'—I—O; and said nitro group-containing aromatic disulfides are represented by the formula

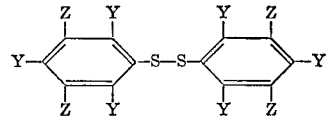

wherein R is selected from aliphatic and cycloaliphatic hydrocarbon radicals having 1 to 20 carbon atoms, R' is an aromatic radical having 2 to 20 carbon atoms, M is a metal of Group Ia of the Periodic Table, X is selected from chlorine, bromine and iodine; and, in said nitro group-containing aromatic disulfides, Z is selected from the group consisting of H, $SO_3H$, and $CO_2H$, Y is selected from the group consisting of H, $NO_2$, $SO_3H$ and $CO_2H$ with at least one of said Y groups on each ring being a $NO_2$ group, and further wherein on each ring there is at least one of a $SO_3H$ and a $CO_2H$ group.

2. A process according to claim 1 wherein the treatment of said residual thiol-containing latex with said agent is carried out at a temperature in the range of —10° to 100° C.

3. The process of claim 1 wherein said residual thiol-containing polymer latex is one prepared in a process whereby a thiol is utilized in the polymerization step and subsequent to said polymerization step residual thiol is in said latex and further wherein said polymer in said polymer latex is a copolymer of a conjugated diene and a vinyl carbocyclic aromatic compound.

4. The process of claim 1 wherein said agent is t-butyl hypochlorite.

5. The process of claim 1 wherein said agent is sodium nitrite.

6. The process of claim 1 wherein said agent is o-iodoso-benzoic acid.

7. The process of claim 1 wherein said agent is the sodium salt of N-chloro-p-toluenesulfonamide.

8. The process of claim 1 wherein said agent is the sodium salt of N-chlorobenzenesulfonamide.

9. The process of claim 1 wherein said agent is bis-(2-nitro-4-carboxyphenyl)disulfide.

10. The process of claim 1 wherein said agent is sodium chlorite.

References Cited

UNITED STATES PATENTS

| | | | |
|---|---|---|---|
| 2,790,752 | 4/1957 | Urban | 196—29 |
| 3,052,625 | 9/1962 | Gordon et al. | 208—190 |
| 3,513,088 | 5/1970 | Karabinos et al. | 208—190 |

OTHER REFERENCES

Chemistry and Industry, September 1966, pp. 1558–9, Wallace et al.

Journal of Organic Chemistry, Yiannios et al., vol. 28, 1963, pp. 3246–7.

HAROLD D. ANDERSON, Primary Examiner

U.S. Cl. X.R.

117—161 UD; 260—2.5 H, 29.6 MQ, 29.6 MN, 29.6 PT, 29.7 SQ, 29.7 N

UNITED STATES PATENT OFFICE

CERTIFICATE OF CORRECTION

Patent No. 3,756,976              Dated: Sept. 4, 1973

It is certified that error appears in the above-identified patent and that said Letters Patent are hereby corrected as shown below:

Column 8, line 48, "2 to 20 carbon atoms" should read

---6 to 20 carbon atoms---.

Signed and sealed this 25th day of December 1973.

(SEAL)
Attest:

EDWARD M. FLETCHER, JR.           RENE D. TEGTMEYER
Attesting Officer                 Acting Commissioner of Patents